INVENTOR.
CHARLES W. HASTINGS
BY Bruce C. Lutz
ATTORNEY

INVENTOR.
CHARLES W. HASTINGS
BY Bruce C. Lutz
ATTORNEY

INVENTOR.
CHARLES W. HASTINGS
BY Bruce C. Lutz
ATTORNEY

INVENTOR.
CHARLES W. HASTINGS
BY Bruce C Lutz
ATTORNEY

INVENTOR.
CHARLES W. HASTINGS
BY Bruce C. Lutz
ATTORNEY

United States Patent Office 3,435,425

Patented Mar. 25, 1969

3,435,425

STORAGE DEVICE WITH READOUT SYSTEM AND HAVING PHOTOCONDUCTORS AND FERROELECTRIC DEVICES

Charles W. Hastings, Lauderdale, Minn., assignor to Honeywell Inc., Minneapolis, Minn., a corporation of Delaware Filed July 5, 1966, Ser. No. 562,786
Int. Cl. G11b 9/02
U.S. Cl. 340—173.2 10 Claims This invention pertains generally to apparatus for storing information and more particularly to ferroelectric materials used as an information storage medium.

In the prior art many types of information storage devices have been used. These include magnetic memories such as magnetic cores, thin-films, and magnetic drums which are generally used for central storage memories in computers. Ferroelectric materials have a hysteresis effect analogous to that of magnetic materials, however, the hysteresis effect in ferroelectric materials is not as "well-behaved" and accordingly magnetic materials have generally been used in preference to ferroelectric materials as storage devices.

A major disadvantage of ferroelectric materials when they are used in an information storage array is that each cell tends to act like a capacitor so that in a matrix array of storage cells there is a large number of parallel paths for current flow. This effect is illustrated in C. F. Pulvari 2,918,655 wherein Pulvari attempts to overcome the effect of the paralleling of ferroelectric cells in an array. The capacitance effect generally causes degradation of the signals so that large scale memory arrays are not feasible. This invention, however, eliminates the problem of ferroelectric cells paralleling by providing a system in which the cells are selected optically thereby eliminating the conductor arrays which were used in Pulvari's array and other similar arrays.

Many uses for storage devices have been found other than for computer memories. One such use is a peripheral storage device for permanently storing information taken from a computer. Such things as paper tapes, paper cards, and magnetic tapes have been used for this type of storage. Paper tapes and cards are, of course, difficult to handle and slow to use. Magnetic tapes have been generally acceptable, however, magnetic tapes have the inherent disadvantages of a movable mechanical system so that accurate alignment and mechanical speed remain as continuing problems.

In many cases, it is also desirable to store analog information, i.e., shades of gray, such as light patterns corresponding to images. J. M. N. Hanlet 3,083,262 illustrates the use of a ferroelectric medium for storing light patterns or images. This invention is an extension of Hanlet's invention so that a ferroelectric medium can be used as a peripheral storage device for computers and also as an image storing device such as that shown by Hanlet or as an associative memory which may be used as a pattern recognizer or similar devices.

The essence of this invention is in the use of a "sandwich" structure where the sandwich consists of a load, a first photoconductive medium which responds to electromagnetic radiation of the particular range of frequencies or wavelengths, a second photoconductive medium which responds to electromagnetic radiation of a difference range of frequencies of wavelengths, and conductors positioned over and under the sandwich structure. A first radiation source provides electromagnetic radiation within the range of frequencies or wavelengths necessary to excite the first photoconductor and a second radiation source provides electromagnetic radiation within the range of frequencies or wavelengths necessary to excite the second photoconductor. The electromagnetic radiation is focused by an optical system so that it falls in strips or beams on the sandwich structure.

A voltage impressed across the conductors enclosing the sandwich structure is normally supported by one or both of the photoconductors so that there is substantially no electric field across the load. At points where one of the photoconductors is excited by electromagnetic radiation, the other photoconductor will still support the voltage. However, where both of the photoconductors are simultaneously excited at a particular point, they will both become conductive at that point so that substantially no voltage can be supported at that point. Thus, the voltage at the selected point is impressed across the load.

When the load is a ferroelectric storage medium, it may be polarized by the electric field impressed across it due to the voltage between the conductors. By focusing the electromagnetic radiation from the two sources in orthogonal beams, unique points can be selected on the ferroelectric medium as is desired. Binary information can be written into or read out of the ferroelectric storage medium depending upon the direction of the applied electric field, or if it is so desired, analog information can be stored or read out of the ferroelectric storage medium.

Accordingly, it is an object of this invention to provide a novel ferroelectric storage device.

It is a further object of this invention to provide a novel means for selecting points on a continuous sheet of ferroelectric material.

These and other objects and advantages of this invention will become evident to those skilled in the art upon a reading of this specification in conjunction with the accompanying claims and drawings, of which:

Figure 1:
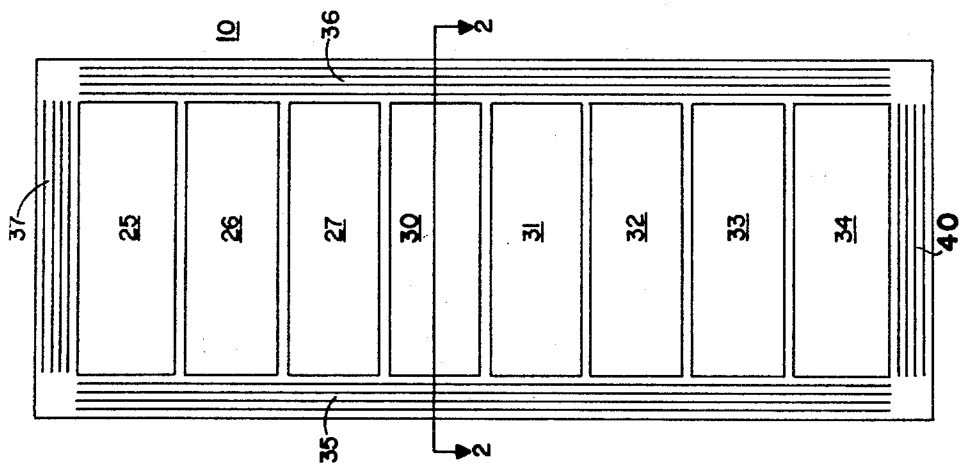
FIGURE 1 is a top view of the sandwich structure.
Figure 2:
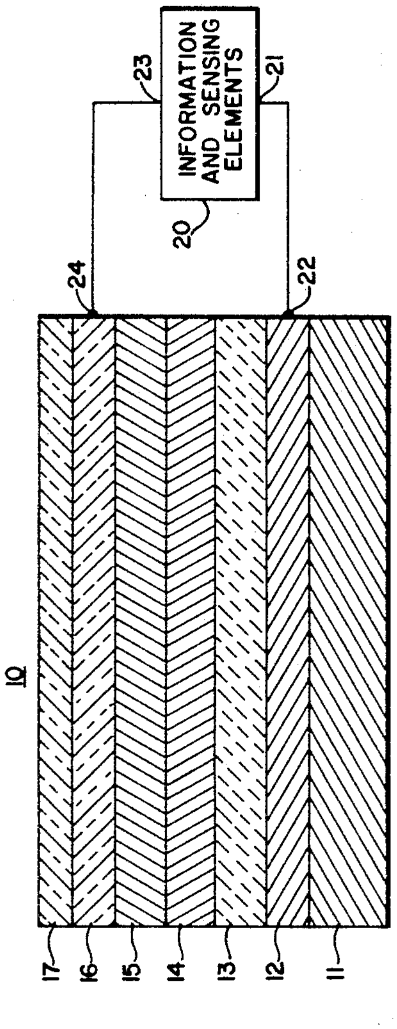
FIGURE 2 is a sectional view of the sandwich structure taken along line 2—2 of FIGURE 1.
Figure 3:
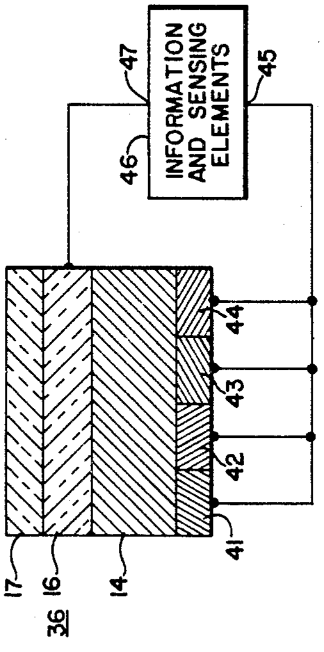
FIGURE 3 is a sectional view of an edge of the sandwich structure taken along line 2—2 of FIGURE 1.

FIGURE 1 shows a top view of the sandwich structure generally designated as 10. FIGURES 2 and 3 show sectional views of the sandwich structure. A substrate or base means 11, which may consist of any suitable material, is used to provide mechanical rigidity for the sandwich structure. A conductive means, plane or medium 12 is positioned on the substrate. If the substrate 11 is conductive, an insulating layer should be placed between conductor means 12 and substrate 11. Conductor means 12 may be of any desired electrically conductive material, however, in the preferred embodiment, it is a metallic conductor. A ferroelectric medium, sheet, or plane 13 is placed adjacent to or over the metallic conductor 12. Again, it may be desired to interpose an insulating layer between the ferroelectric medium 13 and the conductor 12. The ferroelectric medium may consist of any suitable ferroelectric materials such as barium titanate ($BaTiO_3$) or lead zirconate-lead titanate (PZ-PT) ceramic material which display the ferroelectric hysteresis effect.

A photoconductive plane or medium 14 is positioned adjacent to or over the ferroelectric medium. Another photoconductive plane or medium 15 is positioned adjacent to or over the first photoconductive medium 14. Any suitable photoconductive materials may be used for photoconductive mediums 14 and 15. Two conditions are imposed on the selection of photoconductive materials. First, the photoconductive materials must respond to electromagnetic radiation or different wavelengths so that electromagnetic radiation of a particular wavelength will excite only one of the photoconductive mediums 14 and 15. Second, the photoconductive medium 15 must be transparent to electromagnetic radiation of a wavelength which will excite the photoconductive medium 14. For example, cadmium telluride (CdTe) may be used for the photoconductive mediums 14 and 15. Two conditions magnetic radiation in the 8100 to 10800 Angstrom wavelength range, that is, "light" in the near infrared range; its peak sensitivity occurs at about 9000 Angstroms. Photoconductive medium 15 could be cadmium sulfide (CdS) which responds strongly to electromagnetic radiation in the 4000 to 5500 Angstrom wavelength range, but is essentially transparent to radiation in the 6300 and up Angstrom wavelength range.

A conductive means, layer, plane, or medium 16 is positioned adjacent to or over the photoconductive medium 15. Conductive means 16 must be transparent to "light" within the range of wavelengths used to excite the photoconductive mediums 14 and 15. Stannic oxide ($SnO_2$) also known as tin dioxide, is a suitable transparent conductor for use as conductive means 16; a very thin layer of metallic gold (Au) has also been used successfully in this manner. A protective coating 17 may be placed over transparent conductor 16 if required in a given application.

The sandwich structure shown in FIGURE 2 may be formed by successively depositing the various layers on the substrate 11. Those skilled in the art will realize that various methods can be used for forming these layers.

In FIGURE 2, there is also shown a block 20 labeled information and sensing element which has a first output terminal 21 connected to a contact 22 on conductor means 12 and a second output 23 connected to a contact 24 on conductor means 16. Block 20 would contain an energization means for energizing conductor means 12 and 16, to establish an electric field across the sandwich structure. Block 20 would also contain logic circuitry and switches for supplying information for storage in the ferroelectric medium and for reading and interpreting the information read out of the storage medium. The circuitry used in block 20 is conventional logic and signal supplying circuitry similar to that used to supply signals to magnetic memories.

When conductors 12 and 16 are energized by a voltage impressed across terminals 22 and 24, an electric field is applied across the ferroelectric medium 13 and photoconductors 14 and 15. When there is no electromagnetic radiation incident on photoconductors 14 and 15, the resistance of the photoconductors is very high so that substantiallly all of the electric or electrostatic field is "dropped" across the photoconductor. When only one of the photoconductors is excited by incident electromagnetic radiation, the electric field will be "dropped" across the other photoconductor. However, when both of the photoconductors are excited by electromagnetic radiation, they will not support a field at any point where there is coincident excitation. At that point, the electric field will be impressed across the ferroelectric medium and will polarize it either "up" or "down" depending upon the direction of the field. By defining polarization in one direction as a "1" and polarization in the other direction as a "0" the direction of the electric field and of the resultant polarization can be interpreted as binary numbers.

As it is possible to partially polarize the ferroelectric medium 13 as well as polarizing it to "saturation," analog information or "shades of gray" can be stored. When binary information is being stored, it is usually desirable to read out in parallel rather than serial. In FIGURE 1, the top view of the sandwich structure 10 is shown wherein the $SnO_2$ material is divided into eight independent regions 25–27 and 30–34. The information and sensing means would be individually connected to each of these regions so that independent electric fields can be set up between each of the eight $SnO_2$ regions and the metallic conductor 12. Each of the eight $SnO_2$ regions is electrically insulated from its neighboring regions to provide completely independent operation of each region. It is evident that the number of $SnO_2$ regions may be as large or as small as is desired.

Along the sides of the sandwich structure, there is shown a series of code tracks 35 and 36. On the other ends of the sandwich structure, there are shown other code tracks 37 and 40. A cross section of the code track 36 taken along line 2—2 of FIGURE 1 is shown in FIGURE 3. The purpose of these code tracks is to provide a feedback signal so that the electromagnetic radiation sources which provide the electromagnetic radiation to excite the photoconductors may be properly aligned. In FIGURE 3 there is shown the CdTe photoconductor 14 with $SnO_2$ layer 16 deposited over it and the protective coating 17 deposited over the $SnO_2$ region. Beneath the photoconductor 14 there is a series of metallic conductors 41, 42, 43, and 44 positioned such that an electric field can be set up betwen the transparent conductor 16 and the metallic conductors 41–44. Each of the metallic conductors is connected to one terminal 45 of a block 46 labeled information and sensing elements. Block 46 has a second terminal 47 connected to the transparent conductor 16. When light is incident on photoconductor 14, it becomes conductive and the current flow between the transparent conductor 16 and the metallic conductors 41–44 increases. A Gray code or other suitable binary digit code pattern is etched in the photoconductor 14 such that an unambiguous readout can be obtained from the information and sensing elements 46. This readout can be used to determine the position of the electromagnetic radiation on the sandwich structure so that if the position of the incident light is incorrect, a servo system energized by the sensing elements 46 can adjust the apparatus.

Block 46, like block 20, contains conventional circuitry for energizing the code track and sensing the signals therefrom. For example, both blocks 20 and 46 may contain a potential supplying means in series with a current sensor to sense the information stored in the ferroelectric medium and the code track. Block 20 would also contain switching and logic circuitry for writing information into the ferroelectric medium.

Code tracks 35, 37, and 40 are similar to code track 36. Code tracks 37 and 40 would use the CdS photoconductors in place of the CdTe photoconductor 14 for reasons which will become evident hereinafter. The coded tracks may also provide error checking bits such as a parity bit.

As indicated above, one use for memory apparatus of this class is in a fixed or removable storage device, analogous to the current use of magnetic tape storage. The sandwich structure is formed into a memory cartridge which may be inserted into a control unit to store information on the ferroelectric medium. The memory cartridge can then be removed and stored as long as desired. The information can be retrieved by reinserting the memory cartridge in the control unit and reading the information from the ferroelectric medium 13.

Figure 4:
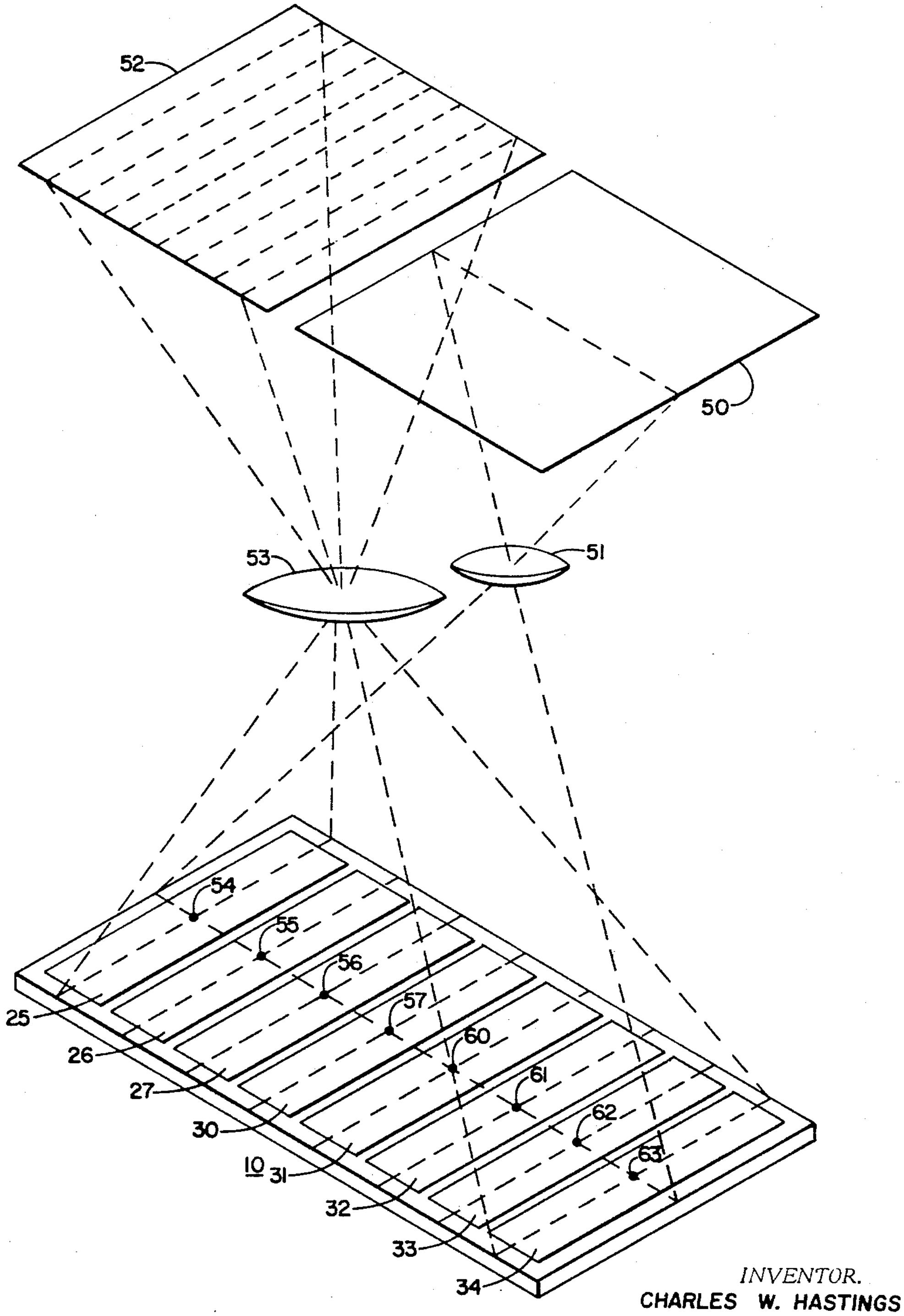
FIGURE 4 is an isometric diagram showing this invention.

FIGURE 4 shows the arrangement of a memory cartridge and the electromagnetic radiation or light sources. In this connection, it should be noted that while the sources may be called light sources, this is not entirely correct because the range of wavelengths may be outside of the visible light spectrum. In FIGURE 4, the memory cartridge 10 is shown together with the eight independent $SnO_2$ regions 25–27 and 30–34. There is also shown a first electromagnetic radiation source 50. Electromagnetic radiation source 50 provides a single beam of light which is focused by an optical means 51 so that it is incident on all of the eight $SnO_2$ regions. While the optical means 51 is shown as a single lens, it is to be realized that a suitable optical system would be much more complex than a single lens. The optical means 51 is shown as a single lens merely for the purposes of illustration.

A second electromagnetic radiation source 52 provides parallel strips or beams of radiation which are focused by an optical means 53 so that one beam is incident on each of the independent $SnO_2$ regions. Alternatively, source 52 could provide one beam of radiation and the beam could be split by mirrors into separate beams with the separate beams being focused on one of each of the independent $SnO_2$ regions, in the example shown in FIGURE 4, the beam from radiation source 50 crosses each of the beams from radiation source 52 at points 54–57 and 60–63 on the surface of the memory cartridge 10. It is evident from the description of FIGURE 2 that at each of the points 54–57 and 60–63 both of the photoconductors will be excited so that they become conductive and information can be stored at those points. As the beams of radiation from source 50 and source 52 move across the photoconductors, different points are selected. The beams may be moved continuously and the electric field may be switched on and off at appropriate times to store information. However, as there will be considerable capacitance between conductors 12 and 16, faster operation may be attained by moving the light beams across the photoconductors discontinuously. While it is not necessary that the light beams from the different sources be at right angles to each other, they are at right angles in the preferred embodiment because that is the most convenient and practical arrangement.

Various mechanical means could be used for moving the light beams across the memory cartridge. For example, a diffraction grating could be used or a system of rotating mirrors could also be used. However, as this would require moving parts, it is preferred that light emitting diodes or electroluminescent materials be used for the radiation sources so that the beams are moved by selecting different sources. For example, an array of electroluminescent strips could be used with each strip being excited to select one line on the memory cartridge 10. Alternatively, an array of light emitting diodes can be used wtih the radiation being spread into beams by optical means.

Figure 5:
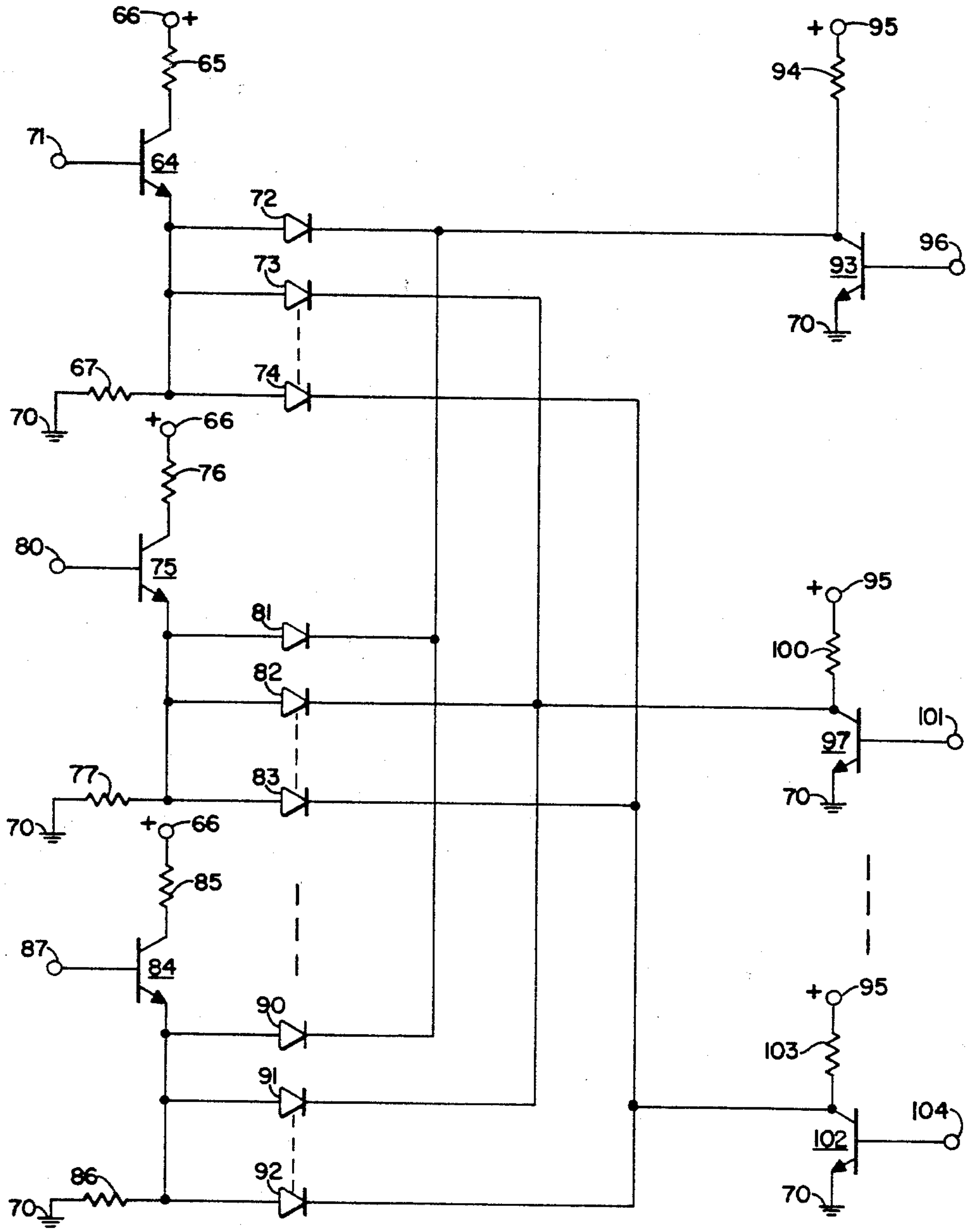
FIGURE 5 is a schematic diagram of electronic circuitry for selecting radiation sources.
Figure 6:
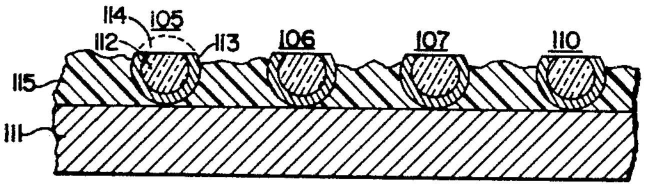
FIGURE 6 is a sectional view of a "light-pipe array" which may be used with this invention.

FIGURES 5 and 6 show a system of diodes which may be used for a radiation source suitable for use in this invention. In FIGURE 5, there is shown a transistor means 64 which has a collector means connected through a resistor 65 to a positive source 66 and an emitter means connected through a resistor 67 to a common conductor or ground 70. An input terminal 71 is connected to a base means of transistor 64. The anodes of diodes 72, 73, and 74 are connected to the emitter of transistor 64.

A second transistor means 75 has a collector means connected through a resistor 76 to the source 66 and an emitter means connected through a resistor 77 to ground 70. An input terminal 80 is connected to a base means of transistor 75. The emitter of transistor 75 is connected to the anodes of diodes 81, 82, and 83.

An *n*th transistor means 84 has a collector means connected through a resistor 85 to source 66 and an emitter means connected through a resistor 86 to ground 70. An input terminal 87 is connected to a base means of transistor 84. The emitter of transistor 84 is connected to the anodes of diodes 90, 91, and 92.

A first switch means or transistor means 93 has a collector means connected through a resistor 94 to a positive source 95 and an emitter means connected to ground 70. An input terminal 96 is connected to a base means of transistor 93. The collector of transistor 93 is connected to the cathodes of diodes 72, 81, and 90.

A second switch means or transistor means 97 has a collector means connected through a resistor 100 to source 95 and an emitter means connected to ground 70. An input terminal 101 is connected to a base means of transistor 97. The collector of transistor 97 is connected to the cathodes of diodes 73, 82, and 91.

An *m*th switch means or transistor means 102 has a collector means connected through a resistor 103 to source 95 and an emitter means connected to ground 70. An input terminal 104 is connected to a base means of transistor 102. The collector of transistor 102 is connected to the cathodes of diodes 74, 83, and 92. The diodes are light emitting diodes such as gallium arsenide (GaAs) diodes which emit electromagnetic radiation within a range of wavelengths which will excite a CdTe photoconductor.

While a 3 x 3 selection array is shown, it is evident that the structure of FIGURE 5 may be extended to an *m* x *n* selection array, where *m* and *n* are numbers corresponding to the numbers of diodes necessary to generate the various radiation beams, by adding transistors to the array.

When no input signals are applied to the various transistors of FIGURE 5, all of those transistors are OFF so that all of the diodes are back biased and no electromagnetic radiation is emitted.

To select a particular diode, one of transistors 64, 75, or 84 is switched ON and simultaneously one of transistors 93, 97, or 102 is switched ON. For example, to select diode 72, a positive input signal applied at terminal 71 will switch transistor 64 ON so that its emitter will go positive due to current flow from source 66 through resistor 65, transistor 64, and resistor 67 to ground 70. However, diode 72 will not be forward biased until an input signal is applied at input terminal 96 to switch transistor 93 ON. When transistor 93 is ON, its collector will drop to substantially ground potential so that current will flow from source 66 through resistor 65, transistor 64, diode 72, and transistor 93 to ground 70. Thus, diode 72 will be forward biased when both of transistors 64 and 93 are ON. When diode 72 is forward biased it will emit light or electromagnetic radiation. In a similar manner, all of the diodes may be selected individually by applying input signals at appropriate pairs of the input terminals. It is evident that this array of diodes can be extended to any number desired.

Each of the diodes in FIGURE 5 emits electromagnetic radiation at a point. This radiation must be spread into a beam by optical means. In FIGURE 6, a method of spreading the radiation from one of the diodes of FIGURE 5 into a beam is shown.

FIGURE 6 shows a sectional view of a "light-pipe" array. A parallel array of optical fibers 105, 106, 107, and 110 is placed on a substrate 111. Each of the optical fibers consists of a central core of light conducting material which will conduct the electromagnetic radiation from the diodes when the diodes are placed in front of the optical fiber. The optical fiber is silvered to prevent losses. For example, optical fiber 105 consists of a light conducting material 112 with a silver coating 113 thereon. The core material of the optical fiber may be a material such as arsenic trisulfide ($AsS_3$) or glass. Part of the fiber 105 is lapped or removed along one side so that the electromagnetic radiation can "leak" out along the length of the fiber. This lapping is illustrated in FIGURE 6 at 114 where the portion of the optical fiber and the silver coating which are lapped away is shown by a dotted line. If the lapping is tapered, it is possible to provide a "light-pipe" which will spread the light from the diode in a uniform beam along the entire length of the optical fiber.

The optical fibers are bound to the substrate by an epoxy 115 which may be any suitable binding material.

In the preferred embodiment, radiation source 50 is an array of parallel electroluminescent strips which are selectively energized to emit light or electromagnetic radiation in parallel beams. The method of selecting the strips may be the same as that shown in FIGURE 5 for selecting the diodes. When electroluminescent strips are used, the light is already spread in a beam so that the "light-pipe" array is not necessary. A suitable electroluminescent material for this purpose is zinc sulfide (ZnS) which emits electromagnetic radiation within a range of wavelengths which will excite the CdS photoconductor. Alternatively, CdS is an electroluminescent material itself so that it can also be used for the radiation source 50. However, ZnS is better known and more widely used. As another alternative, silicon carbide (SiC) light-emitting diodes may be used together with a "light-pipe" array for the radiation source 50. Accordingly, it is evident that there are various combinations of light-emitting diodes and "light-pipe" arrays and strips of electroluminescent material which can be used for sources 50 and 52. The choice of a particular radiation source for sources 50 and 52 is limited only by the response characteristics of the photoconductors.

Figure 7:
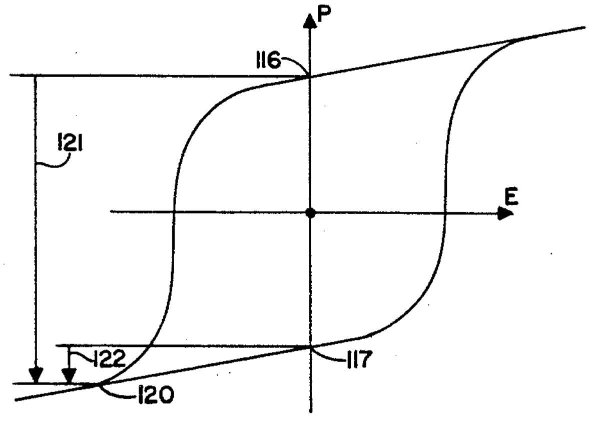
FIGURE 7 is a graph of a hysteresis loop for illustrating storage and read out of information from a ferroelectric storage medium.

To write into and read out of the ferrolelectric material, various techniques analogous to those used with magnetic materials may be used. One such technique will be described with reference to FIGURE 7 which shows a hysteresis loop for ferroelectric materials. The axes are labeled P for polarization and E for electric field. This hysteresis loop is analogous to B–H hysteresis for magnetic materials. The positive remanence point 116 can arbitrarily be denoted as the "1" state. Similarly, the negative remanence point 117 can be arbitrarily defined as the "0" state. Information can be written into the ferroelectric medium by applying an electric field across the ferroelectric medium in an appropriate direction to polarize a spot in the ferroelectric medium. Information can be read out of the ferroelectric medium by applying an electric field such that the particular spot or cell is driven to negative saturation or point 120 on the hysteresis curve. The sensing elements then discriminate between a "1" and a "0" by the magnitude of the read out signal. In FIGURE 7, the arrow 121 represents the magnitude of a "1" read out while the arrow 122 represents the magnitude of a "0" read out.

The operation of the ferroelectric memory in the manner described with reference to FIGURE 7 destroys the information which was previously stored. Thus, it is necessary to restore the information if it is desired to retain it for future use. This destructive readout restoration principle is well known in the area of magnetic memories.

Figure 8A:
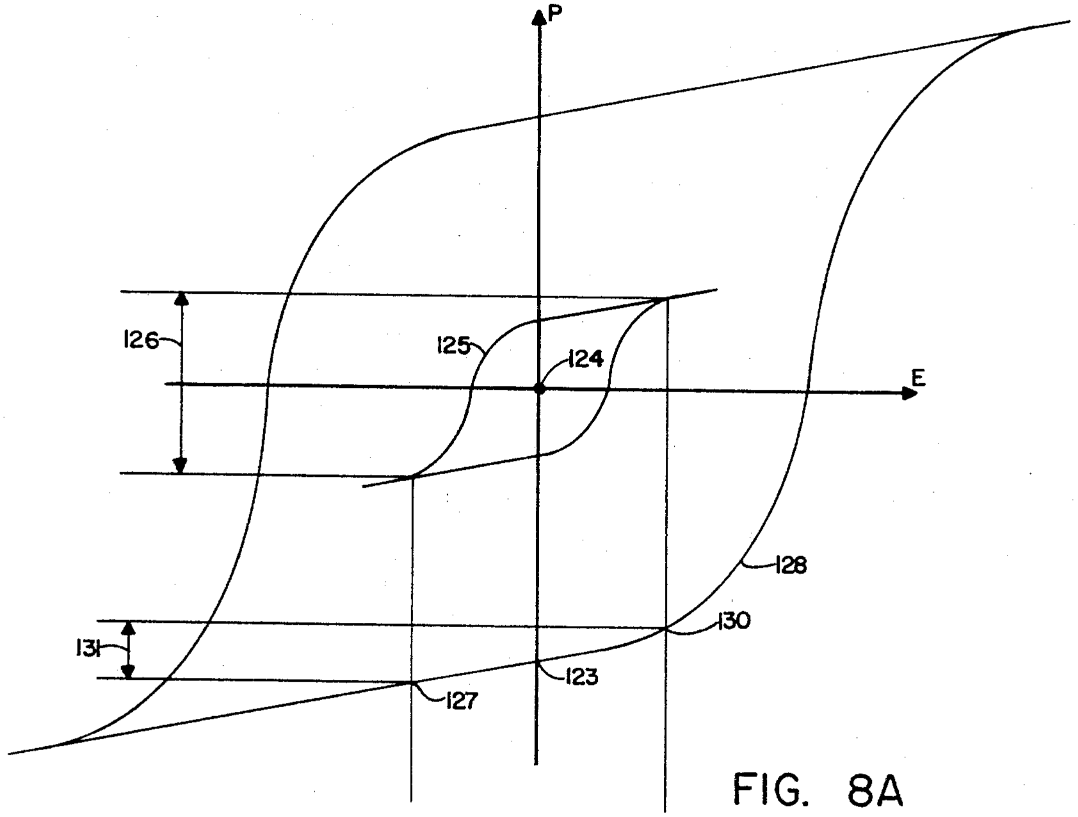
FIGURES 8A and 8B show graphs of a hysteresis loop and an electric field for an alternative method of storing and reading information from the ferroelectric medium.
Figure 8B:
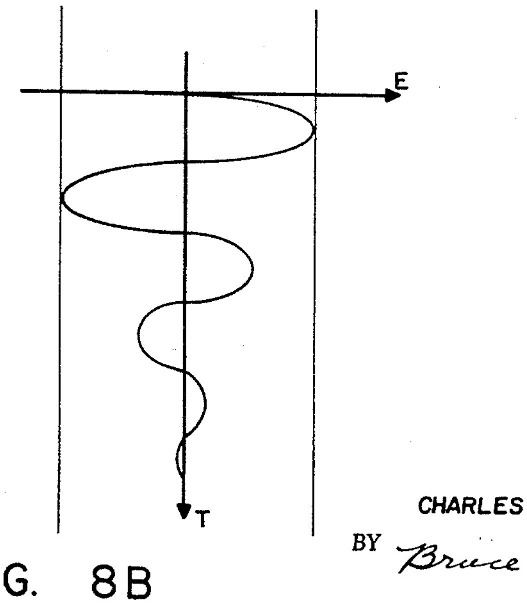

FIGURE 8A shows another hysteresis loop for ferroelectric materials. FIGURE 8B shows an electric field which may be used for nondestructive readout of information from the ferroelectric medium. In FIGURE 8A, the "0" state is defined as the negative remanence point 123 on the P-axis. The particular cell or spot in the ferroelectric medium is depolarized to represent a "1." Thus, a "1" is defined as the unpolarized point 124. The ferroelectric material may be depolarized by applying a decaying sinusoidal field across a particular spot or cell. A similar field of smaller magnitude is illustrated in FIGURE 8B where the electric field is plotted against time as a rapidly decaying or "dither" field. To read information out of the ferroelectric material when it is operated in this mode, the electric field shown in FIGURE 8B may be applied across the ferroelectric cell. When a "1" is stored, the electric field will drive the cell around the minor hysteresis loop shown at 125. The magnitude of the output signal is represented by the arrow 126. When a "0" is stored in the cell, the cell will be driven along the major hysteresis loop 128 between points 127 and 130 to provide the output signal represented by arrow 131. Thus, the sensing elements will discriminate between the magnitude of the read out to determine whether a "1" or a "0" is stored in a particular cell.

Figure 9:
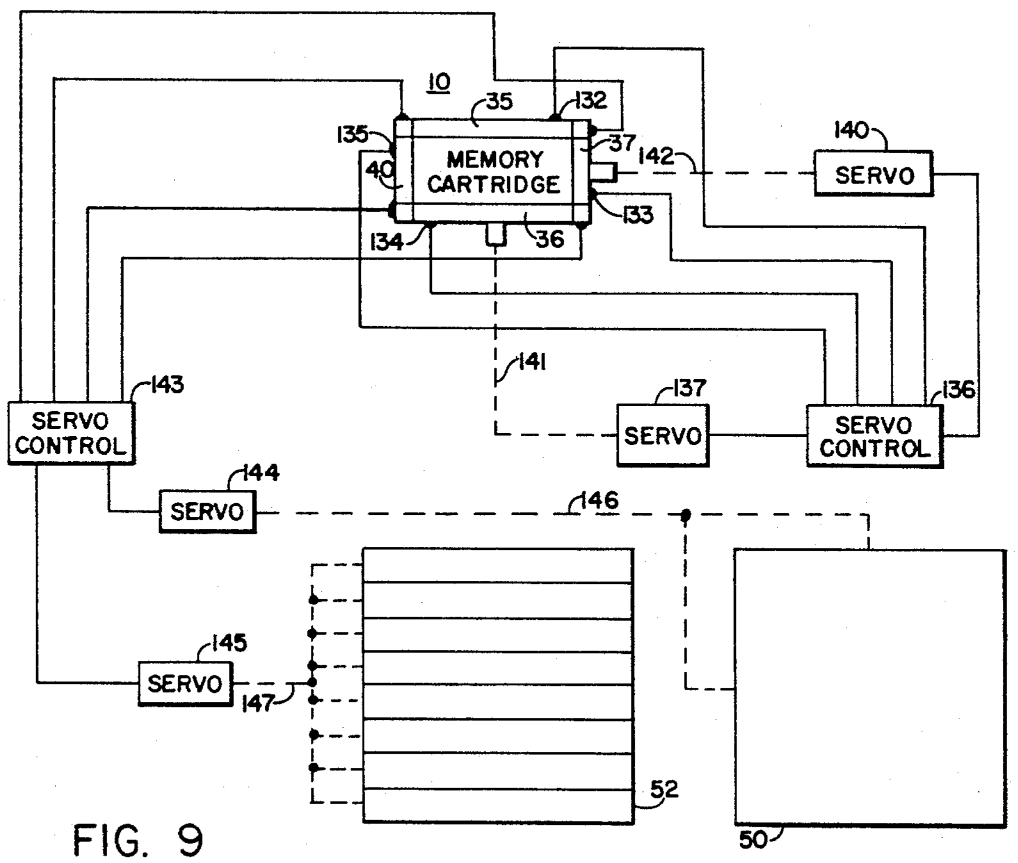
FIGURE 9 is a schematic diagram of a system for aligning the sandwich structure and the radiation sources.

In FIGURE 9, a system for servoing the various components of this invention is shown. In the preferred embodiment of this invention, the optical means and radiation sources are detached from the memory cartridge 10 so that the optical means and radiation sources can be used with different memory cartridges. Memory cartridge 10 is inserted into a frame or holder which contains sensors 132, 133, 134, and 135 to sense the position of memory cartridge 10. The output signals from these sensors are coupled via leads to a servo control unit 136. Servo control unit 136 provides output signals to servos 137 and 140. Servos 137 and 140 are connected to the memory cartridge by a mechanical means or linkage 141 and 142, respectively. Servos 137 and 140 adjust the position of the memory cartridge in response to signals from the servo control unit 136. Thus, when the memory cartridge is inserted into the holder or frame, it is automatically servoed into position with respect to the frame.

As was explained above, coded signals are obtained from code tracks 35, 36, 37, and 40 to indicate the position of the light beam on the photoconductors. These coded output signals are conducted via leads to a servo control unit 143 which controls servos 144 and 145. Servo 144 is mechanically connected to radiation source 50 by a mechanical link 146. Servo 144 adjusts the position of radiation source 50 to properly align the beam of radiation on the memory cartridge 10. Similarly, servo 145 is connected by a mechanical link 147 to radiation source 52 and adjusts the plurality of beams from radiation source 52 on the memory cartridge 10.

It is to be understood that while a particular servoing system has been shown in FIGURE 9, other systems will be known to those skilled in the art which may work as well as the system shown in FIGURE 9.

While I have shown and described a particular embodiment of my invention, it is to be understood that I do not wish to be limited solely to the embodiment described. Accordingly, I wish to be limited only by the scope of the appended claims.

I claim as my invention:

1. Information retention apparatus comprising, in combination:
   - an information storage medium;
   - conductive means situated adjacent one side of said information storage medium;
   - a first photoconductive medium situated adjacent a second side of said information storage medium, said first photoconductive medium being responsive to electromagnetic radiation of a first wavelength range;
   - a second photoconductive medium situated adjacent a said first photoconductive medium, said second photoconductive medium being responsive to electromagnetic radiation of a second wavelength range and transparent to radiation within said first wavelength range;
   - a conductive medium situated adjacent said second photoconductive medium, said conductive medium being transparent to electromagnetic radiation in said first and second wavelength ranges;
   - energization means connected between said conductive means and said conductive medium for establishing an electric field across said information storage medium and said first and second photoconductive mediums;
   - a first electromagnetic radiation source for providing electromagnetic radiation of wavelengths within said first wavelength range;
   - a second electromagnetic radiation source for providing electromagnetic radiation of wavelengths within said second wavelength range; and
   - optical means for focusing the electromagnetic radiation from said first and second sources on said first and second photoconductive mediums.

2. Information storage apparatus comprising, in combination:

a load means;

a first photoconductive medium positioned adjacent said storage medium, said first photoconductive medium becoming conductive in response to electromagnetic radiation within a first wavelength range;

a second photoconductive medium positioned adjacent said first photoconductive medium, said second photoconductive medium becoming conductive in response to electromagnetic radiation within a second wavelength range;

means for supplying a signal connected across said load means and said first and second photoconductive mediums;

means for supplying electromagnetic radiation of wavelengths within said first wavelength range;

means for supplying electromagnetic radiation of wavelengths within said second wavelength range; and means for focusing the electromagnetic radiation in crossed beams of radiation on said first and second photoconductive mediums.

3. Information storage apparatus as defined in claim 2 wherein said load means is a storage medium of a ferroelectric material.

4. Information storage apparatus as defined in claim 3 wherein said storage medium, said first photoconductive medium and said second photoconductive medium are sequentially deposited over a first conductive means with a second conductive means being deposited over said second photoconductive medium, said first conductive means and said second conductive means together with energization means connected therebetween comprising said means for supplying an electric field.

5. Information storage apparatus as defined in claim 4 wherein said means for supplying electromagnetic radiation of wavelengths within said first wavelength range and said means for focusing the electromagnetic radiation provide a first beam of electromagnetic radiation focused on the storage apparatus and said means for supplying electromagnetic radiation of wavelengths within said second wavelength range and said means for focusing the electromagnetic radiation provide a plurality of second beams of electromagnetic radiation focused on the storage apparatus, said second beams crossing said first beam so that the points where said beams cross define uniquely selected points on said storage medium.

6. Information storage apparatus as defined in claim 5 wherein said means for supplying electromagnetic radiation include a plurality of light emitting semiconductor means, and a plurality of switch means for selecting and energizing said light emitting semiconductor means in response to selective switching signals applied thereto.

7. Information storage apparatus comprising, in combination:

a ferroelectric medium;

a first photoconductive medium responsive to electromagnetic radiation of wavelengths within a first range;

a second photoconductive medium responsive to electromagnetic radiation of wavelengths within a second range;

first conductive means;

second conductive means, said ferroelectric medium, said first photoconductive medium, and said second photoconductive medium being disposed in adjacent substantially parallel planes between said first and second conductive means;

a first radiation source for providing electromagnetic radiation within said first range;

a second radiation source for providing electromagnetic radiation within said second range;

optical means for focusing said electromagnetic radiation on said first and second photoconductive mediums in beams of radiation which cross each other; and energization and sensing means connected between said first and second conductive means, said energization and sensing means establishing an electric field between said first and second conductive means whereby said electric field is selectively impressed across said ferroelectric medium in response to the energization of said photoconductive mediums by said electromagnetic radiation.

8. Information storage apparatus as defined in claim 7 in combination with first sensing means fixedly attached to said conductive means and said photoconductive mediums, said sensing means responding to said electromagnetic radiation to provide a coded signal indicative of the relative positions of the beams of radiation;

first servoing means connected to receive said coded signal and further connected to said first and second radiation sources for aligning said first and second radiation sources;

second sensing means positioned to sense the relative position of the information storage apparatus; and second servoing means connected for receiving a signal from said second sensing means and further connected to the information storage apparatus for aligning the information storage apparatus relative to said second sensing means.

9. Information storage apparatus as defined in claim 7 wherein said second radiation source and said optical means provide a plurality of substantially parallel beams of electromagnetic radiation within said second range and said first conductive means consists of a plurality of conductive mediums disposed in substantially the same plane, said parallel beams of electromagnetic radiation within said second range being focused by said optical means on said plurality of conductive mediums such that only one of said parallel beams strikes each of said plurality of conductive mediums, and the beam of radiation provided by said first radiation source and said optical means being focused by said optical means to cross each of said plurality of conductive mediums.

10. Information storage apparatus as defined in claim 7 wherein said first and second radiation sources includes a plurality of light emitting semiconductor means, and a plurality of switch means for selecting and energizing said light emitting semiconductor means in response to selective switching signals applied thereto.

References Cited

UNITED STATES PATENTS 3,312,957 4/1967 Fleisher ---------- 340—172.5

TERRELL W. FEARS, *Primary Examiner.*

U.S. Cl. X.R.

250—219; 340—173